United States Patent [19]
Shannon et al.

[11] Patent Number: 6,009,659
[45] Date of Patent: Jan. 4, 2000

[54] FLIP FLOAT

[76] Inventors: Harry E. Shannon; Doug Shannon, both of 1303 Raymond Rd., Jackson, Miss. 39204

[21] Appl. No.: 09/228,205

[22] Filed: Jan. 11, 1999

[51] Int. Cl.⁷ .................................................. A01K 93/00
[52] U.S. Cl. .................... 43/44.91; 43/44.87; 43/44.9; 43/43.14
[58] Field of Search .................... 43/44.87, 44.9, 43/44.91, 17, 44.88, 44.92, 43.14

[56] References Cited

U.S. PATENT DOCUMENTS

| | | | |
|---|---|---|---|
| 2,004,414 | 11/1935 | Menefee | 43/49 |
| 2,157,003 | 4/1939 | Mussina | 43/27 |
| 2,493,971 | 4/1950 | Johnson | 43/49 |
| 2,591,332 | 4/1952 | Behensky | 43/44.9 |
| 4,458,439 | 7/1984 | Garret, Sr. | 43/17.6 |
| 5,784,829 | 7/1998 | Latta | 43/44.91 |
| 5,852,894 | 12/1998 | Shannon | 43/17 |

*Primary Examiner*—Jack W. Lavinder
*Attorney, Agent, or Firm*—Gordon E. Baird

[57] ABSTRACT

A flip float is fishing float comprising a floatation ball having differently, distinguishably colored first and second halves with a shaft extending through the floatation ball perpendicular to the interface between the halves. A stem assembly containing an internal weight and stops on either end of the stem assembly is disposed to slide within the shaft between the stops contained at the ends of the stem assembly. When the float is inverted, the stem assembly shifts from one stop to the other and changes the center of gravity of the float which causes the float to remain inverted. A fisherman can tell at a glance, by noticing which color is out of the water, whether his line has been struck. Attachment of differently colored, reflecting material to the ends of the tube allows the fisherman to shine a light on the float at night to determine whether his line has been struck.

2 Claims, 2 Drawing Sheets

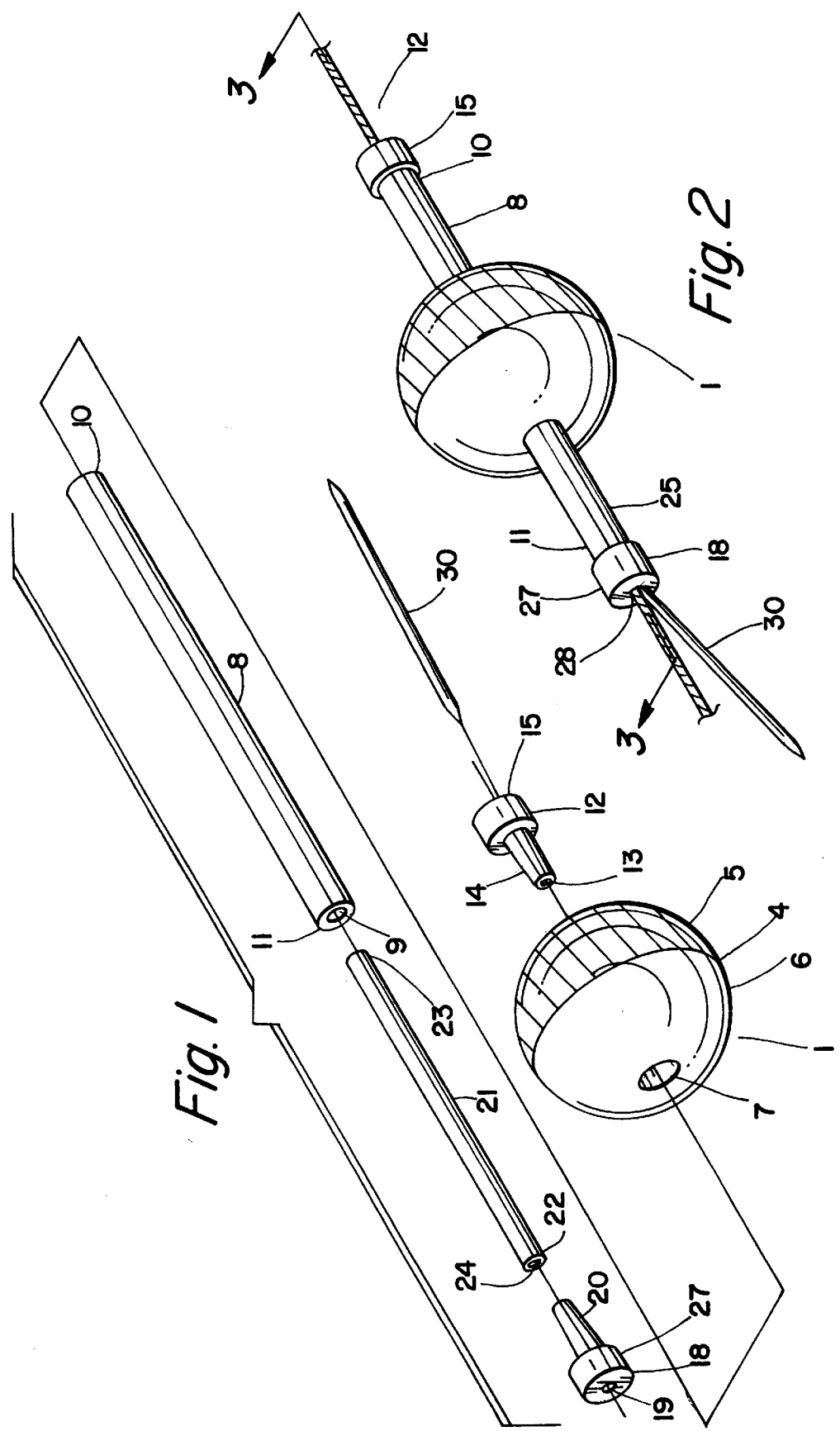

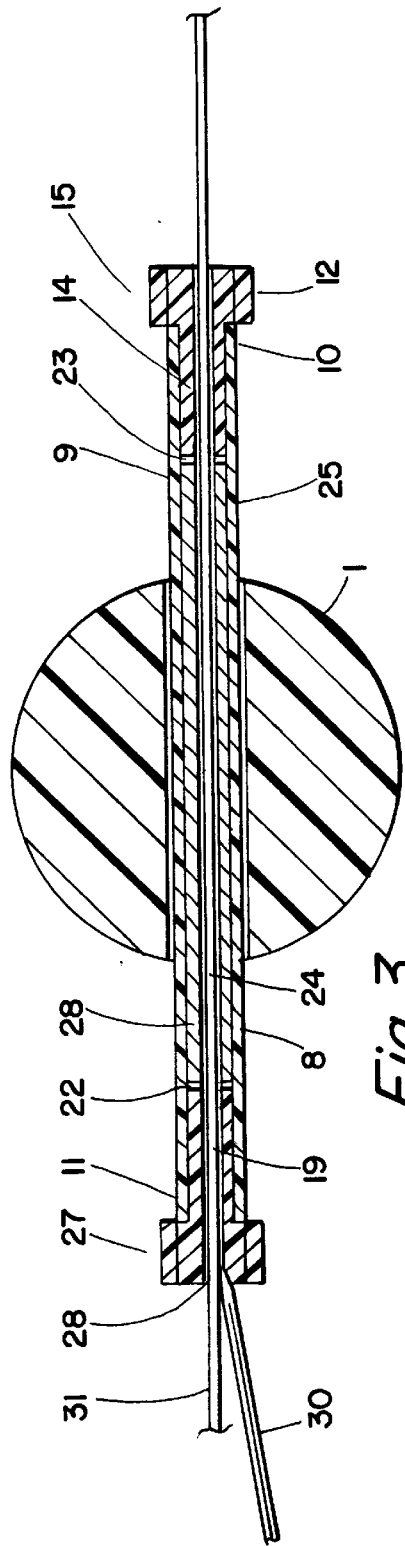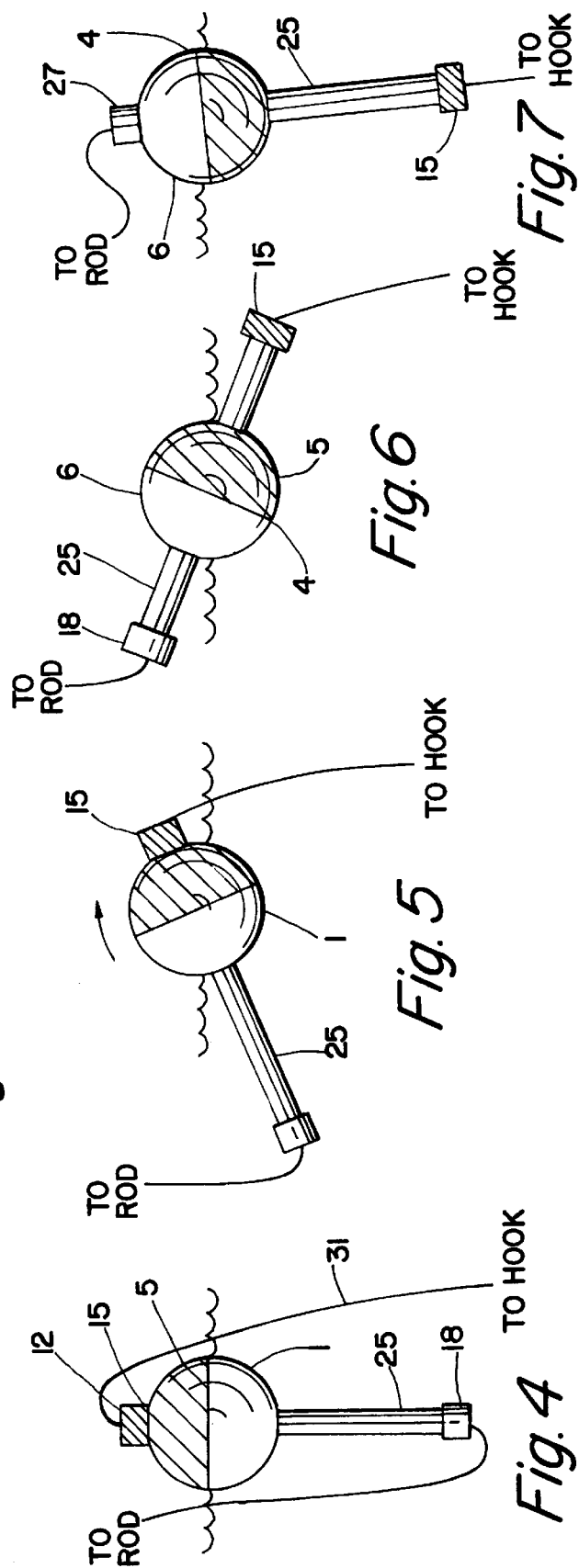

FLIP FLOAT

BACKGROUND OF THE INVENTION

This invention relates to fishing floats designed for sport fishing. This invention, the flip float, specifically relates to a fishing float which will alert a fisherman to the fact that a fish has struck his fishing line, even if the fishing is taking place at night.

Fishing floats have long been used by fishermen for a variety of purposes. A float can be used with a line and hook beneath it to deploy the hook (and bait) at a fixed depth. By watching to see when the float is pulled under the water the fisherman can tell when he has a bite. Another type of float is a slip float which has an eyelet or loop attached to the float through which a fisherman can run a line which is free to move. The movement of the line is restricted by stops attached to the line on either side of the eyelet. The line and float can then be cast whereupon the float will stay on the surface of the water and the line will slip downward through the eyelet until a stop is encountered. This will again deploy the hook at a depth lying between the surface and a preset depth set by the placement of a stop on the fishing line.

The pulling of the float under the water will alert the fisherman that he has a bite. A slip float is very useful for surf fishing; however, when fishing in rough or choppy waters, it is often difficult to determine if there is a bite because of the water motion. This is not a problem with a flip float, because it turns to a different color when there is a bite, and the fisherman can see for sure what is going on.

A flip float consists of a float that will flip over and stay flipped over when the fishing line is pulled by a fish. The flip float contains a weight or weighted tube that shifts when the float is inverted so that the center of gravity of the float changes in such a manner that the float remains inverted after it is flipped over. The submerged part of the flip float is a different color from the part that is above the water, so it is readily apparent when a fish has taken the bait and turned the flip float over. Thus, if a fisherman is not looking when he gets a bite, he can tell at a glance, by noting which color is above the surface of the water, whether a fish has taken the bait. With an ordinary float the fish may be on the hook but inactive so that the float may remain on the surface of the water giving no indication that one has had a bite.

A conventional fishing float is a good signaling device whose primary function is to go under the water when a fish bites. This action is a fisherman's signal to set the hook, but one must be watching this float at all times to know when or if there has been a bite. The flip float is a better signaling device. Its primary function is to have the visible part of the float turn a different color when a fish bites the hook. This action is a signal for the fisherman to set the hook whether the flip float goes under the water or not.

A flip type float containing an internal weight which slides to invert the float is described in Canada Patent No. 547,067. The float consists of a hollow spherical body with a wire fixed about a diameter of the sphere and the weight constrained to slide along the wire. The weight is contained entirely within the hollow spherical body of the float. A second embodiment disclosed in the patent consists of a hollow spherical body containing a spherical or cylindrical weight constrained to move within a tube contained entirely within the hollow spherical body.

A fishing bobber for controlling the depth at which a fishing hook is deployed was described by Johnson in U.S. Pat. No. 2,493,971. Johnson's device has a tubular runner or slide rod extending through a floatation ball with an adjustable external weight attached to the stem. The purpose of Johnson's device is to make the bobber stable in a position where line is taken in or out so as to be able to adjust the depth of operation of the hook. Although similar in appearance to some flip floats, Johnson's bobber has a completely different purpose from that of a flip float.

The applicants herein, in U.S. Pat. No. 5,852,894 describe a flip float with a weight disposed to freely slide within a bore which extends through a buoyant body. O-rings are disposed in grooves on the external surface of the weight with the O-rings acting as stops to limit the extent to which the weight can slide through the buoyant body.

The present invention is of simplified construction having a stem assembly disposed to slide freely in a shaft through a floatation ball causing the center of gravity to change and the flip float to invert. The stem assembly consists of a stem, an internal weight and two end caps which serve as stops to limit the motion of the stem assembly through the shaft in the floatation ball. The flip float has a total of only five parts which are easily assembled which results in a device that can be economically produced. It solves the problem of creating a fishing float which will let a fisherman know whether a fish has struck his line, even at night, by the introduction of a fishing float with a moveable stem assembly which can shift through the body of the float when a fishing line attached to the stem assembly is struck by a fish. The stem assembly shifts when the float is overturned and passes partially through the body of the float causing it to invert and be stable in the inverted position. This design leads to a lower center of gravity than the design of previous flip type floats; the lower center of gravity in turn makes the float more stable when in either of its two equilibrium positions. The introduction of reflecting materials of different, distinguishable colors on the top and bottom of the float makes it possible to tell at night, by shining a light on the float, whether the float has been inverted due to a fish striking the line.

SUMMARY OF THE INVENTION

An embodiment of the flip float comprises a floatation ball having two differently, distinguishably colored halves, a shaft, which is a cylindrical hole, extending through the floatation ball perpendicular to the plane of intersection of the two halves and a stem assembly which is disposed to slide freely within the shaft and which extends beyond the periphery of the floatation ball at both ends of the shaft. The stem assembly comprises a stem, an internal weight disposed within the hollow of the stem, two end caps having flanges on one end wherein the end caps are secured to the ends of the shaft so that the end caps secure the weight within the shaft. The flanges of the end caps act as stops to limit the motion of the stem assembly when said stem assembly is slideably disposed within the shaft of the floatation ball. The internal weight and the end caps have axial bores which form a single tunnel through the stem assembly. A fishing line can be strung through the tunnel and secured to the flip float.

By a suitable choice of the length of the stem and the mass of the internal weight relative to the size of the floatation ball the flip float may be made stable in either the normal or the inverted position. Table I gives data for construction of flip floats which are stable in either orientation. The internal weight is made of lead, the stem and end caps are made of plastic and the floatation ball is made of a close-textured polystyrene having a specific gravity of approximately 0.01. The end caps are attached to the stem with adhesive. Flip floats can be made much larger than those for which data are given.

TABLE I

Parameters for construction of stable flip floats

| Diameter of Floatation Ball | Length of Stem Assembly | Length of Internal Weight | Diameter of Internal Weight |
| --- | --- | --- | --- |
| 1.0 in. | 2.6 in. | 1.6 in. | 0.1 in. |
| 1.3 in. | 3.6 in. | 2.6 in. | 0.1 in. |
| 1.5 in. | 4.0 in. | 2.6 in. | 0.2 in. |
| 2.0 in. | 6.5 in. | 5.0 in. | 0.2 in. |

Flip floats can be used with fishing poles of any type as well as rod and reel of any type. They are useful for surf casting, for use as a free floating flip float (jug fishing), for use while tied onto an object such as a pier or snag, and for use with an anchored array of hooks. Also, a fisherman can place an array of flip floats in the water within sight of his camp so that the array can be observed as to activity without leaving camp; the fisherman need not leave camp until he is ready to take some fish off of the hooks.

It is accordingly an objective of the invention to provide a flip float device for fishing which will invert and remain inverted from its normal position when deployed when a fish tugs on the fishhook.

A further objective of this invention is to provide a flip float which may be colored differently upon its upper and lower halves so that a fisherman can tell where the action is at any time during day or night from a great distance away.

A further objective of the invention is to provide reflective materials of differing colors on the ends of the tube extending through the flip float so that a fisherman fishing at night can shine a light on the float and at a glance tell whether there has been a bite by a fish on the fishhook.

A further objective of the invention is to provide for a flip float which may be deployed for float fishing by letting the flip float be deployed alone on the water when fishing for fish such as catfish.

A further objective of the invention is to provide for a flip float which may be deployed by casting with a fishing rod.

A further objective of this invention is to provide a flip float which may be used as a slip float.

A further objective of this invention is to provide a flip float which may be used for jug fishing, casting or surf fishing.

A final objective is to provide for a flip float which has simplicity of construction, inexpensive manufacture and efficient, easy operation.

BRIEF DESCRIPTION OF THE DRAWINGS

FIG. 1 shows an exploded perspective view of the flip float.

FIG. 2 shows a perspective view of the assembled flip float with a fishing line, secured by a toothpick, deployed through the flip float.

FIG. 3 is a longitudinal cross-section view of a flip float taken along line 3—3 of FIG. 1.

FIG. 4 shows the use of the flip float deployed in the water in an upright position.

FIG. 5 shows the flip float deployed in the water beginning to invert after the hook has been struck by a fish.

FIG. 6 shows the flip float deployed in the water further in the process of inverting after the hook has been struck by a fish.

FIG. 7 shows the flip float, deployed in the water, completely inverted after the hook has been struck by a fish.

DESCRIPTION OF THE PREFERRED EMBODIMENT

Referring now to the drawings, FIG. 1 is an exploded perspective view of a flip float, reference numeral 1 indicates the flip float as a whole. Reference numeral 4 indicates a buoyant floatation ball having first half 5 having a first distinct, distinguishable color and second half 6 having a second distinct, distinguishable color. Shaft 7 extends diametrically through the floatation ball, perpendicular to the plane of intersection of the first and second halves of the floatation ball. Stem 8 has first end 10, second end 11 and axial hollow 9 which is a cylindrical cavity extending the entire length of the stem. Internal weight 21 is a cylindrical shell having first end 23, second end 22 and third bore 24 which extends axially through the length of the internal weight. First end cap 12 is a cylindrical body containing first bore 13, first cylindrical end 14 and first flange 15 The first flange is larger in diameter than the diameter of the shaft of the floatation ball. Second end cap 18 is a cylindrical body containing second bore 19, second cylindrical end 20 and second flange 27. The second flange is larger in diameter than the bore of the buoyant spherical body. First end cap, second end cap, internal weight and stem when assembled (as shown in FIG. 2 and FIG. 3) comprise the stem assembly.

FIG. 2 is a perspective drawing showing the assembled flip float. Reference numeral 1 indicates the flip float as a whole. The stem assembly 25 comprises stem 8, the internal weight secured in the axial hollow of the stem, first end cap 12 fastened to the first end 10 of the stem with the first cylindrical end of the first end cap disposed within the axial hollow at the first end of the stem, and second end cap 18 fastened to the second end 11 of the stem with the second cylindrical end the second end cap disposed of within the axial hollow at the second end 11 of the stem. The stem assembly 25 is disposed within the shaft of the floatation ball. First flange 15 and second flange 27 keep the stem assembly secure within the shaft of the floatation ball so that the stem assembly cannot slide out of the floatation ball. The first bore, second bore and third bore are aligned so as to form continuous tunnel 28 through the stem assembly. Fishing line 31 is shown threaded through the tunnel; the fishing line is secured to the one of the end caps of the stem assembly by toothpick 30 which is wedged between the fishing line and the tunnel.

FIG. 3 is a longitudinal cross-section view of a flip float taken along line 3—3 of FIG. 2. Reference numeral 1 indicates the flip float as a whole. The stem assembly 25 comprises the stem 8, internal weight 21 disposed within the axial hollow 9 of the stem, first end cap 12 with first cylindrical end 14 inserted into the axial hollow at first end 10 of stem and second end cap 18 with second cylindrical end 20 inserted into the axial hollow at second end 11 of the stem with both end caps secured to the stem whereby said first and second cylindrical ends retain the internal weight within the stem with first cylindrical end in contact with first end 23 of the internal weight, and second cylindrical end in contact with second end 22 of the internal weight The stem assembly is slideably disposed within the shaft 7 of the floatation ball 4. First flange 15 and second flange 27 constrain the motion of the stem assembly so that the stem assembly cannot slide out of the floatation ball shaft. The first bore 13, second bore 19, and third bore 24 form tunnel 28 through which fishing line 31 is threaded. Fishing line 31 is secured to the shaft bore by tooth pick 30.

FIG. 4 shows the flip float 1 in water, with the flip float in an upright position disposed for fishing. First half 5 of the floatation ball rests above the surface of the water. The first flange 15 of the stem assembly 25 rests against the floatation ball with fishing line 31 extending out of the tunnel at the first end cap 12 of the slide assembly and continuing towards the fishing hook. The fishing line extends through the tunnel emerging from the second end cap 18 of the stem assembly towards the fishing rod (or other fishing apparatus).

FIG. 5 shows the flip float deployed in the water beginning to invert. A force on the hook end of the fishing line has pulled the first end cap 15 of the stem assembly 25 downwards.

FIG. 6 shows the flip float 1, deployed in the water, further in the process of inverting. The first end cap 15 of the shaft assembly 25 is pulling away from the first half 5 of the floatation ball 4 and the second end cap 18 of the stem assembly is sliding towards the second half 6 of the floatation ball. A force on the hook end of the fishing line is pulling the first end cap of the shaft assembly further downwards.

FIG. 7 shows the flip float completely inverted due to the force exerted on the flip float by the hook end of the fishing line. The stem assembly 25 has been pulled through the floatation ball, and the floatation ball inverted so that the second flange 27 now rests against the floatation ball acting as a stop limiting the motion of the stem assembly. The second half 6 of the floatation ball having the second distinct, distinguishable color is now showing above the water. The second half being exposed above the surface of the water alerts a fisherman that his line has been struck.

We claim:

1. A flip float, which will completely invert and remain inverted until reset by the fisherman when a fishing line attached to the flip float is struck by a fish, comprising:

a floatation ball which will float in water, said floatation ball having a first half of a first distinct, distinguishable color and a second half of a second distinct, distinguishable color; said floatation ball having a shaft extending through both the first half and the second half of said floatation ball, said shaft being perpendicular to the interface of said first half with said second half of said floatation ball;

a stem assembly having a first end and a second end and having length greater than the length of said shaft and being disposed to slide within said shaft with first end of said stem assembly extending at least partially through said shaft outside of said first half of said floatation ball and with second end of said stem assembly extending out at least partially through said shaft outside of said second half of said floatation ball; wherein said stem assembly comprises:

(a) a stem containing an axial hollow, a first end and a second end;

(b) an internal weight secured within said hollow of said stem, said internal weight having a first end, a second end and a third bore;

(c) first stopping means attached to said first end of said stem limiting the extent to which said first end of said stem can penetrate into said shaft, said first stopping means having a first bore extending through said first stopping means;

(d) second stopping means attached to said second end of said stem limiting the extent to which said second end of said stem can penetrate into said shaft, said second stopping means having a second bore extending through said second stopping means, whereby said first bore, second bore and said third bore form a tunnel through the length of said stem assembly through which a fishing line may be strung, where the first stopping means limits the extent the first end of said stem assembly can penetrate into the first half of said floatation ball and the second stopping means limits the extent the second end of said stem assembly can penetrate into the second half of said floatation ball whereby the flip float will completely invert and remain inverted until reset by the fisherman when a fishing line attached to the flip float is struck by a fish.

2. A flip float as claimed in claim 1 wherein:

said first stopping means further comprises a first end cap having first cylindrical end and a first flange wherein said first cylindrical end is attached within the hollow at the first end of the stem;

said second stopping means further comprises a second end cap having second cylindrical end and a second flange wherein said second cylindrical end is attached within the hollow at the second end of the stem.

* * * * *